United States Patent Office 3,767,779
Patented Oct. 23, 1973

3,767,779
PROCESS FOR MANUFACTURING HYDROGEN PEROXIDE
Michel Coingt, Grenoble, France, assignor to Oxysynthese, Paris, France
Continuation-in-part of abandoned application Ser. No. 645,736, June 13, 1967. This application July 6, 1971, Ser. No. 160,121
Int. Cl. C01b 15/02; C07c 49/68
U.S. Cl. 423—588          6 Claims

ABSTRACT OF THE DISCLOSURE

A working solution of quinone and tetrahydroquinone dissolved in an organic solvent is subjected to hydrogenation-oxidation reactions and the hydrogen peroxide formed in each oxidation stage is removed, and the working solution is recycled, the rate of hydrogenation preferably being at least 80% of the theoretical maximum and the tetrahydroquinone preferably forming the major part of the quinone and tetrahydroquinone, wherein the working solution contains not less than 150 g. per litre of degraded substances.

---

Figure 1:
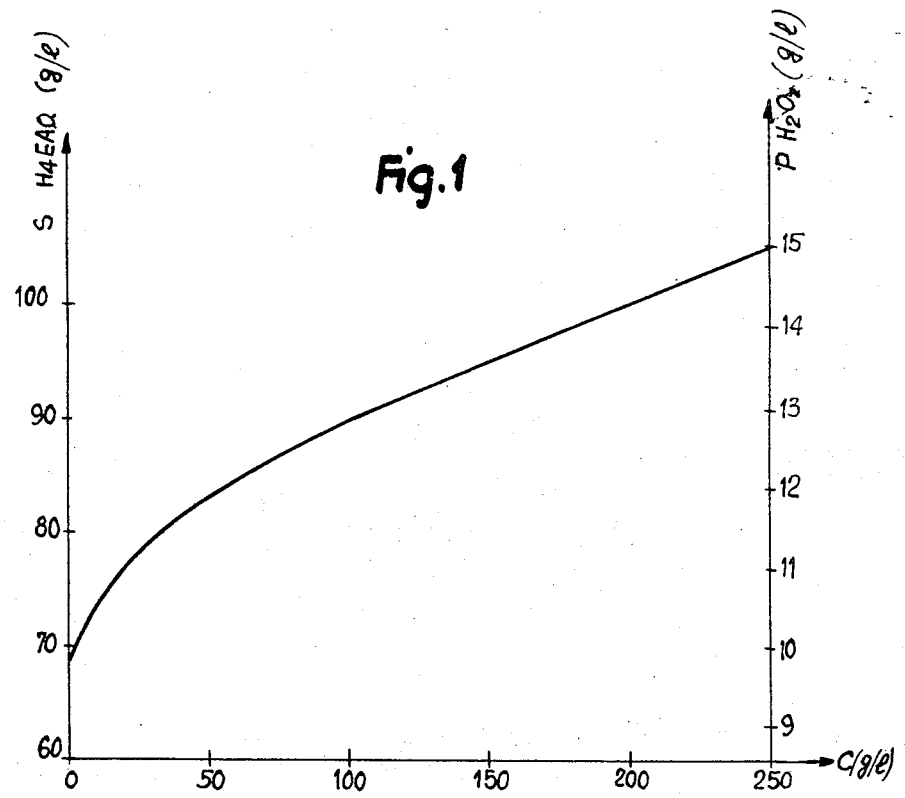

This is a continuation-in-part of application Ser. No. 645,736, filed June 13, 1967, withdrawn in favor of the present case.

This invention relates to the manufacture of hydrogen peroxide.

There are known cyclic processes for manufacturing hydrogen peroxide which use one or more quinone compounds or homologues thereof dissolved in a solvent or a mixture of solvents. The quinone compounds or homologues thereof used are generally anthraquinone and its alkyl or aryl substituted derivatives. The stages leading to hydrogen peroxide being obtained comprise, in succession, reducing the quinone compounds to the corresponding hydroquinones, then oxidizing the hydroquinones to peroxides and finally extracting the hydrogen peroxide from the solution before the solution is recycled to the reduction stage. When the solvent for the quinone compound is organic in nature and is immiscible with water, the hydrogen peroxide can be extracted with water.

The reduction of the quinone compounds to the corresponding hydroquinones is generally effected with hydrogen in the presence of a catalyst based on nickel or palladium. However, under these conditions, this reaction is not the only one to occur; other, slower reactions, which do not lead to hydroquinone, also occur. The most rapid of these secondary reactions consists in the fixation of hydrogen on the nuclei of the quinone compound, to give the tetrahydro and octahydro derivatives, e.g. tetrahydroanthraquinone and octahydroanthraquinone. These derivatives still have the quinone function and, in practice, they behave as hydrogen peroxide generators, particularly the tetrahydro derivatives.

On the other hand, other reactions affect the quinone function; the reduction affects one or both CO groups. The products formed are not hydrogen peroxide generators and this consequently reduces the productivity of the solution. These products, known as degraded substances, correspond to a loss of quinones and it has usually been sought to limit their increase in the working solution, either by reducing their speed of formation, for example by improving the selectivity of the catalyst, or by effecting the "reconversion" thereof into productive quinones at a stage adjoining the main process cycle.

However, the accumulation of these degraded substances generally occurs in a more or less rapid manner, as is shown by the necessity of having to compensate for the corresponding quinone losses by additions and also by a change in the properties of the working solution.

As previously stated one of the reactions which accompanies the reduction of the quinones to hydroquinones, and which is produced at a relatively high speed, is that resulting in the formation of the tetrahydrogenated derivative. The concentration of this derivative increases at the expenses of the quinone, their sum remaining constant in the absence of reactions giving degraded substances. In practice, the concentration of the tetrahydrogenated derivative approaches a maximum value, which depends on the working conditions of the whole process cycle.

At the highest rates of reduction (reduction of 90% or more of the quinones), the productivity is found to be fairly quickly limited by the solubility of the tetrahydrogenated derivative in the solvent. The solvent is in fact generally a mixture of two constituents, one of which is a good solvent of the quinone form and the other of which is a good solvent of the hydroquinone form. A judicious choice of the ratio between the two constituents of the solvent mixture permits the maximum productivity to be obtained, that is to say the quasi-saturation in the quinone state, and in the hydroquinone state, for the working temperatures of the cycle. The productivity is thus limited by the solubility of the quinone and tetrahydroquinone, particularly of the tetrahydrogenated derivative which is generally less soluble than the original quinone.

One method of improving the productivity consists in increasing the concentration of the original quinone, which improves the solubility of the hydrogenated state because of the associative properties of the quinone-hydroquinone mixtures. By simultaneously increasing the proportion of the better solvent of the quinone form in the binary solvent, the solubility of the tetrahydroquinone in the unreduced state is improved.

Nevertheless, it has been recognized that this method can provide only a limited gain in solubility of the unreduced form of the tetrahydroquinone with respect to that which is assured by the present invention.

Belgian Pat. No. 672,419, of Nov. 17, 1965, describes a process for the preparation of hydrogen peroxide in which in certain embodiments under specified conditions the presence of degraded substances is advantageous. The major objective in these embodiments employing the degraded material appeared to be (page 14, lines 5–22) the ability to reduce the hydrogenation temperature by some 5–10° C. while retaining the same productivity as in the absence of such "degraded substances," such material tending to increase the solubility of the hydroquinone forms, and thus the capacity of the working solution to produce hydrogen peroxide.

In this known process, a quantity of 20 to 120 and preferably 50–65 g. per litre of solids (page 13, line 17), other than the quinone and hydroquinone compounds, formed from 2-ethylanthraquinone and 2-ethyl-tetrahydroanthraquinone during the continuous recyclings of the working solution has been found to be of interest.

In those embodiments of the Belgian patent which are concerned with the utilization of what is referred to as unidentified material, it is emphasized that the effect of the presence of such material upon increasing the solubility of the quinol forms in the hydrogenated solution, and thereby the hydrogen peroxide producing capacity of the working solution, varies with the temperature of hydrogenation and the proportion of quinone present in the working solution. It is also clear from the examples, that the solvent is a critical aspect of operation in accordance with the Belgian patent. Accordingly, the Belgian patent provides various zones of quinone and solvent composition which are favorable to the increase of productivity.

The Belgian patent provides ranges and includes limitations, or restrictions, relating to the concentration of degraded substances, depending upon the other parameters discussed above. In one zone of operation, the range provided is 20 to 110 grams per liter, desirably 40 to 80 grams per liter, and preferably 50 to 65 grams per liter, of the unidentified material. In this situation, the proportion of H₄EAQ is from 35 to 85%, suitably 50 to 75%, and preferably 65%, whereas the degree of hydrogenation is at least 65% of the theoretical maximum, and the temperature of hydrogenation is preferably 50-70° C. (page 13, lines 12-22 and page 14, lines 1-4).

In another zone of operation (page 13, lines 23-30), the proportion of H₄EAQ is 60-85%, preferably 65%, the degree of hydrogenation is 50-85%, preferably 65-70%, and the quantity of unidentified material in this realm of operation is stated to be 50-100 grams per liter.

Thus, from the generalized teachings of this reference, setting forth the zones of operation, there is provided a fairly strong teaching of the use of a maximum of 110 grams per liter of degraded substances when working under the above described conditions, and it is preferred to use only 50-65 grams per liter in one zone and a maximum of 100 grams per liter in the other zone. The importance of using less than 100 grams per liter of degraded substance is also clear from the working examples, primarily Example 2, Table 2 appearing at page 18 of the Belgian patent. Here the use of more than 100 grams per liter of unidentified material provided the most unfavorable results among the seven runs. Further comparing the second run with the fourth and fifth, it is seen that in spite of the fact that approximately the same percentage of H₄EAQ was present, the use of the greater proportion of unidentified material reduced the productivity. Similarly, comparing the first run with the fifth, even though the hydrogenation percent was closely similar, the productivity of the fifth run was considerably less, apparently because of the presence of more than 100 grams per liter of unidentified material.

Thus, the Belgian patent, considered in its entirety, does not suggest that there is any advantage in the use of higher concentrations of degraded substances. In fact, the contrary is suggested, it being clear from what is disclosed that in one zone of operation, the unidentified material should be present in an amount of no more than 100 grams per liter, and in another zone of operation, no more than 110 grams per liter and preferably no more than 65 grams per liter, and this is substantiated by the working examples.

At the best then, the Belgian patent indicates that by using its procedure, it is possible to envisage a productivity of 6.5 g., 9 g. or 11 g. per liter of hydrogen peroxide, by hydrogenating at a hydrogenation temperature lower than that corresponding to the same productivity in the absence of "degraded substances." From the foregoing, it appears that the productivity is limited by the solubility of the tetrahydrogenated derivative in the unreduced state, which is generally less soluble than the original quinone. The usual operational temperature employed in a cyclic process are such that it is at the extraction stage that the temperature is lowest, this defining the solubility of the quinones.

According to the present invention there is provided, in a cyclic process for the manufacture of hydrogen peroxide in which a working solution of a quinone compound and of the corresponding tetrahydroquinone in an organic solvent is subjected to hydrogenation and then oxidation reactions to form hydrogen peroxide, which is extracted from the solution, and the solution from which the hydrogen peroxide has been extracted is returned to the hydrogenation stage, the improvement which comprises using a working solution which contains not less than 150 g. per litre of degraded substances formed from the quinones and tetrahydroquinones during the recycling of the working solution.

In accordance with the present invention a different approach is provided in comparison with the Belgian patent. To obtain the maximum effect so as to decrease the insolubilization temperature and to improve productivity, different working conditions are provided in the present invention. Thus, the concentration of H₄EAQ in the present invention is greater, namely 80-100%, preferably 90%, than in the Belgian patent wherein the concentrations of H₄EAQ are, for the most part, low, and preferably less than 70% in the two zones of operations using unidentified material.

As pointed out above, in the Belgian patent the rate of hydrogenation is limited to 50-85% when the concentration of H₄EAQ is 60-85% (see claim 15, as well as page 13, lines 23-30). In the present invention, to the contrary, there is used not only an elevated concentration of H₄EAQ, as pointed out above, but the rate of hydrogenation is elevated to 80-100%. In this case, from a combination of operating conditions not suggested by the Belgian patent, there has now been discovered that in an unexpected manner, an elevated concentration of degraded substances has the following effect: (1) there is an increase of the solubility of the non-reduced quinones (not hydrogenated) and (2) there is an improvement of working conditions in spite of the higher concentration of H₄EAQ, the rate of hydrogenation being maintained and there being obtained more hydrogen peroxide with a temperature of insolubilization lower than that of hydrogenation.

The process of the present invention permits substantially increasing the solubility of the unreduced tetrahydrogenated derivative.

The process of the present invention provides an improvement of working conditions in spite of high concentrations of H₄EAQ, a result not evident from the Belgian patent.

The present invention involves not only the use of a greater concentration of degraded substances from that which should be used following the process of the Belgian patent, but it also involves, in association with such increased quantity of degraded substances, a high concentration of H₄EAQ, of a high rate of hydrogenation, and of a lower temperature of insolubilization than the temperature of hydrogenation. The process of the present invention has industrial importance and has the distinct advantage of working at high concentrations of degradable substances and of H₄EAQ. Under these conditions there is provided a surprising increase in the level of productivity.

Thus, while there is no recognition in the Belgian patent but there is any direct relationship between an increasing quantity of degrading substance or unidentified material and an increasing solubility of quinones, independent of degree of hydrogenation, percentage of H₄EAQ, temperature of hydrogenation and solvent system, in the present invention it is found that there is a direct relationship between increasing the quantity of degraded substances and increasing the solubility of the quinones. It has been noted that this solubility increases proportionally with the quantity of degraded substances and correlatively that the productivity of the solution, defined as the quantity of hydrogen peroxide which can be produced on each cycle by the unit of working solution, also increases.

Furthermore, in accordance with the present invention, it is found that the solubility of the quinones used in the selected solvent continues to increase, thereby providing an increasing hydrogen peroxide yield, independent of other factors, and concentrations of degraded substances from 150-250 grams per liter of working solution, in spite of the fact that the greatest increase in solubility of the H₄EAQ per added gram of degraded substances occurs during the addition of the first 50 grams per liter of degraded substance.

The process of the present invention enables productivities higher than that of the known processes to be obtained. With a concentration of 250 g. per liter of degraded substances, it is possible to visualize a production of about 15 g. of hydrogen peroxide per liter, this representing a very appreciable improvement.

This improved process is applicable to any system of quinones and solvents. It is especially suitable for the cyclic process for manufacturing hydrogen peroxide in which a working solution of 2-ethylanthraquinone and 2-ethyltetrahydroanthraquinone dissolved in a binary solvent comprising an aromatic hydrocarbon, preferably a $C_9$ hydrocarbon, and a cycloalkanol ester, such as methylcyclohexyl acetate, is subjected to hydrogenation.

As pointed out above, the rate of hydrogenation is high, preferably being at least equal to 80% of the theoretical maximum and advantageously being 90% or more. The hydrogenation temperature is preferably in the range of from 50° to 100° C., temperatures in the region of 70° C. being preferred.

Advantageously, the tetrahydroquinone is present in said working solution in a quantity exceeding the quantity of quinone compound in the working solution. Upon reduction, the working solution should contain 80–100% tetrahydroquinone, preferably about 90% tetrahydroquinone.

The invention is illustrated by the following comparative and illustrative examples in which there were used solutions formed of 2-ethyl-19,10-anthraquinone, its tetrahydrogen derivative i.e. 2-ethyl-5,6,7,8-tetrahydro - 9,10-anthraquinone and the degraded substances formed therefrom dissolved in a binary solvent. For each solution, the concentration of degraded substances was arbitrarily chosen, the different solutions used in the experiments being obtained from a mother solution. Each solution was then saturated with the tetrahydroanthraquinone derivative at a temperature of 17° C. and then the concentration of the anthraquinone compound was adjusted to 10% of that of the tetrahydroethylanthraquinone. In order to ensure that the solvent did not intervene as a parameter in the results which were obtained, the solvent used in each example consisted of 57% by volume of methylcyclohexyl acetate and 43% by volume of a $C_9$ aromatic hydrocarbon; this solvent will be referred to in the examples as "Solvent 57/43."

In the different solutions, a quantity of quinones equivalent to the dissolved tetrahydroethylanthraquinone is reduced by catalytic hydrogenation, i.e. about 90% of the total of the quinones.

COMPARATIVE EXAMPLE 1

Using a palladium catalyst and operating at 70° C., there were hydrogenated 400 cc. of a solution of the type described above which was prepared so as to contain 66.8 g. of tetrahydroethylanthraquinone and 6.7 g. of ethylanthraquinone i.e. 73.5 g. total solute, per litre of Solvent 57/43. This solution, which contained no inert, or degraded substances, was used as a reference solution for comparisons with the solutions, containing "degraded substances," used in the other examples.

The hydrogen absorbed during the hydrogenation process corresponded to the formation of 9.55 g. of $H_2O_2$ per litre of solution. Analysis showed that the solution contained 9.56 g./l. of $H_2O_2$. The insolubilization temperature in the hydrogenated solution was 58–60°C.

EXAMPLE 1

A solution containing 151.1 g. of "degraded substances," 92.4 g. of tetrahydroethylanthraquinone and 9.2 g. of ethylanthraquinone i.e. 255.7 g. of total solute, per litre of Solvent 57/43 was hydrogenated under the conditions described in Comparative Example 1. The hydrogen absorbed during the hydrogenation process corresponded to the formation of 13.20 g. of $H_2O_2$ per litre of solution. Analysis showed that the solution contained 13.20 g./l. of $H_2O_2$.

The insolubilization temperature in the hydrogenated solution was 43–45° C.

EXAMPLE 2

A solution containing 190.0 g. of "degraded substances," 97.7 g. of tetrahydroethylanthraquinone and 14.2 g. of ethylanthraquinone i.e. 302.8 g. of solute, per litre of Solvent 57/43 was hydrogenated under the conditions described in Comparative Example 1. The hydrogen absorbed during the hydrogenation process corresponded to the formation of 13.95 g. of $H_2O_2$ per litre of solution. Analysis showed that the solution contained 13.80 g./l. of $H_2O_2$.

EXAMPLE 3

A solution containing 228.0 g. of "degraded substances," 104.7 g. of tetrahydroethylanthraquinone and 11.3 g. of ethylanthraquinone i.e. 344 g. of solute, per litre of Solvent 57/43 was hydrogenated under the conditions described in Comparative Example 1. The hydrogen absorbed during the hydrogenation process corresponded to the formation of 14.95 g. of $H_2O_2$ per litre of solution. Analysis showed that the solution contained 14.93 g/l. of $H_2O_2$.

The insolubilization temperature in the hydrogenated solution was 33–35° C.

Figure 2:
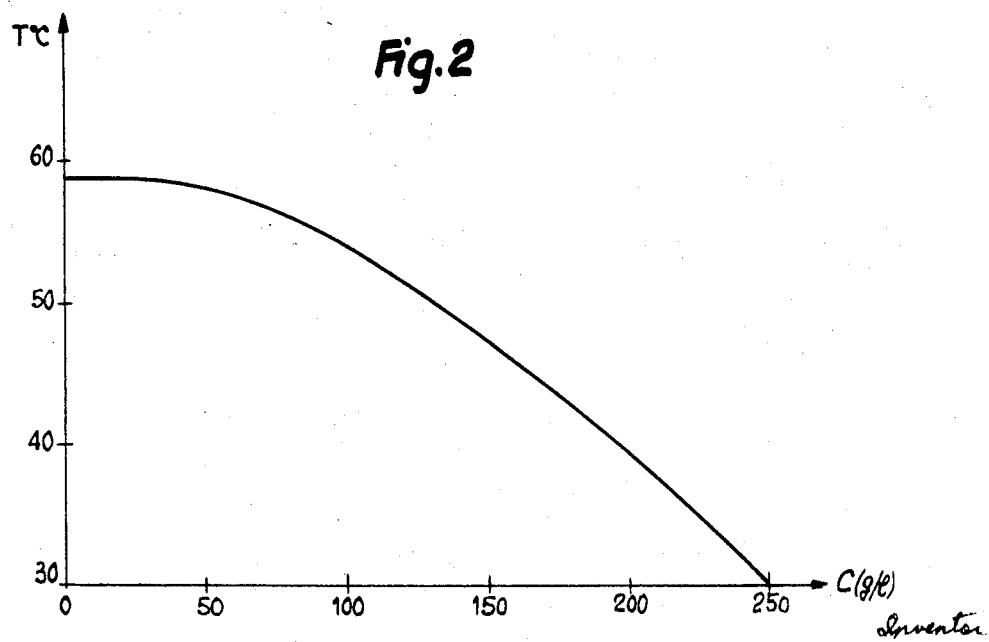

The results obtained in the foregoing examples are summarized in FIGS. 1 and 2 of the accompanying drawings FIG. 1 shows the change in the solubility of the tetrahydroethylanthraquinone at 17° C. as a function of the concentration of "degraded substances" in the working solution. The concentrations, C, of the "degraded substances," expressed as g. per litre, are plotted as abscissae, and the solubilities, S, $H_4EAQ$, of the tetrahydroethylanthraquinone, expressed as g. per litre, are plotted as ordinates. The curve of FIG. 1 clearly shows the particularly favorable influence of the "degraded substances" on the solubility of the tetrahydroethylanthraquinones and on the productivity, P, of the solution, expressed as grams of hydrogen peroxide per litre of solution. The production capacity is plotted on a second ordinate axis. It can be seen from this curve that a concentration of 150 g./l. of "degraded substances" permits a productivity, P, of almost 14 g./l. to be obtained, that a concentration of "degraded substances" of 200 g./l. permits a productivity, P, higher than 14 g. per litre to be obtained, and that a concentration of "degraded substances" of 250 g./l. permits a productivity, P, approaching 15 g./l. to be obtained.

FIG. 2 shows the change in the insolubilization temperature in the solution after hydrogenation as a function of the concentration of "degraded substances" under the conditions previously described, i.e. concentrations increasing at the same time as regards "degraded substances" and hydroquinone. The concentration C, of "degraded substances," expressed as g./l., is plotted as abscissae, and the insolubilization temperature. T (° C.), is plotted as ordinates. This curve shows the particularly favorable influence of the "degraded substances" as concentrations higher than 150 g./l.

EXAMPLE 4

There was prepared a solution containing 95 g. of tetrahydroethylanthraquinone and 15 g. of ethylanthraquinone i.e. 110 g. of quinone, and 150 g. of "degraded substances" per litre of Solvent 57/43. This solution was worked in a cyclic process for the manufacture of hydrogen peroxide of the type already described. In the process 75 litres of the solution were successively subjected to hydrogenation on a palladium catalyst at the temperature of 70° C., then to oxidation with air at 70° C. and finally to an extraction with water at 25° C. The process also comprised, between the extraction and the hydrogenation, a stage for re-converting the "degraded substances" into quinone.

The hydrogenation was regulated by means of suitable additions of catalyst so as to maintain the productivity at 14.0 and then at 14.5 g. of $H_2O_2$ per litre of organic solution, these values corresponding respectively to 98.0 and 101.5 g./l. of hydroquinone.

During the functioning of the cyclic process, the tetrahydroethylanthraquinone content of the solution was seen to increase progressively and then to be stabilized between 100 and 105 g./l. Simultaneously, the degradation of the quinones was shown by an increase in the concentration of "degraded substances" of about 15 g./l., which was compensated for by the addition of quinone.

Although working beyond the solubility limits, as shown by the curves in the accompanying drawing, there was no insolubilization during the process over an operational period of several weeks because of the working temperatures employed.

On hydrogenation, there was obtained a productivity higher than that which could be expected from the concentration of "degraded substances" of 150 to 170 g./l., according to the preceding examples.

The insolubilization temperature in the hydrogenated solution was 52–54° C.

The curve in FIG. 2 of the accompanying drawing, which curve shows insolubilization temperatures, represents the lower working limit of the hydrogenated solution for the considered equivalent of hydrogen peroxide.

The $H_2O_2$ equivalent obtained is a function of the solubility of the tetrahydroethylanthraquinones. In Examples 1 to 3, the basis is the solubility at 17° C. However, as shown by Example 4, for a cyclic process in which the minimum temperature is higher, viz 25° C., it is possible to have a higher productivity; nevertheless, the insolubilization temperature in the hydrogenated solution is then higher.

The foregoing examples uses solutions of the given type (nature and proportion of the constituents) under given conditions. However, the present invention is not limited to this type of solution or to the method of working as described. Within the scope of the process using anthraquinone, any other system of quinones and solvents, in which the content of "degraded substances" is increased, provides possibilities of increasing the maximum productivity. It will be understood that modifications may be made without departing from the invention, and the invention is intended to cover what is claimed and equivalents.

What is claimed is:

1. In a cyclic process for the manufacture of hydrogen peroxide in which a working solution of a quinone compound and of the corresponding tetrahydroquinone in an organic solvent in the presence of a quantity of unidentified degraded substace is subjected to hydrogenation and then oxidation reactions at a temperature of about room temperature to about 100° C. to form hydrogen peroxide, which is extracted from the solution, and the solution from which the hydrogen peroxide has been extracted is returned to the hydrogenation stage, the improvement wherein the working solution contains increased concentrations of quinone and tetrahydroquinone compounds and from 150 grams up to 250 grams of degraded substances per liter of working solution formed from the quinone and tetrahydroquinone and the rate of hydrogeneration is at least 80% up to 100% of the theoretical maximum, said tetrahydroquinone being present in said working solution in a quantity of on the order of about 90% of the total weight of quinone and tetrahydroquinone in said working solution, the temperature of hydrogenation being 50–100° C., to produce 13.2 to about 15 g. $H_2O_2$ per liter of working solution.

2. A process in accordance with claim 1 wherein the minimum concentration of degraded substances is 190 g. per liter of working solution.

3. A process according to claim 1, wherein the said organic solvent consists of a mixture of a cycloalkanol ester and an aromatic hydrocarbon.

4. A process according to claim 3, wherein the organic solvent comprises methylcyclohexyl acetate and an aromatic hydrocarbon containing 9 carbon atoms.

5. A process according to claim 3, wherein the quinone is 2-ethylanthraquinone and the tetrahydroquinone is tetrahydro-2-ethylanthraquinone.

6. A process according to claim 5, wherein the hydrogenation temperature is in the region of 70° C. and the rate of hydorgenation is in the region of 90% of the theoretical maximum.

References Cited
UNITED STATES PATENTS 3,540,847   11/1970   Logan _____ 23—207

OSCAR R. VERTIZ, Primary Examiner

H. S. MILLER, Assistant Examiner

U.S. Cl. X.R.
423—589; 260—369